United States Patent [19]

Kawamura et al.

[11] Patent Number: 4,734,845
[45] Date of Patent: Mar. 29, 1988

[54] SYSTEM FOR SIMULTANEOUS DISPLAY OF A TROJECTORY UPON A STILL PICTURE

[75] Inventors: Hideaki Kawamura; Teruyuki Matsumura, both of Hachioji; Takashi Iwagaya, Hino, all of Japan

[73] Assignee: Fanuc Ltd, Minamitsuru, Japan

[21] Appl. No.: 913,658

[22] PCT Filed: Feb. 12, 1986

[86] PCT No.: PCT/JP86/00059
§ 371 Date: Sep. 22, 1986
§ 102(e) Date: Sep. 22, 1986

[87] PCT Pub. No.: WO86/04697
PCT Pub. Date: Aug. 14, 1986

[30] Foreign Application Priority Data

Feb. 12, 1985 [JP] Japan .................................. 60-25053

[51] Int. Cl.⁴ ............................................. G06F 15/46
[52] U.S. Cl. ................................... 364/146; 364/171
[58] Field of Search .............................. 364/171, 146

[56] References Cited

U.S. PATENT DOCUMENTS

| | | | |
|---|---|---|---|
| 4,200,915 | 4/1980 | Struger et al. | 364/146 X |
| 4,519,026 | 5/1985 | Nozawa et al. | 364/171 X |
| 4,521,860 | 6/1985 | Kanematsu et al. | 364/171 X |
| 4,556,833 | 12/1985 | Kishi et al. | 364/171 X |
| 4,556,957 | 12/1985 | Ichikawa | 364/171 |
| 4,633,409 | 12/1986 | Sekikawa | 364/171 X |
| 4,635,183 | 1/1987 | Isobe et al. | 364/146 X |

Primary Examiner—Jerry Smith
Assistant Examiner—Steve L. Hoang
Attorney, Agent, or Firm—Staas & Halsey

[57] ABSTRACT

A trajectory display system displays a still picture, which includes a machining region, and a trajectory by making a color designation in the form of a black base picture background color (a) and a three-color bit pattern R (red), G (green) and B (blue). A display color (e) of the still picture and the display color (e) of the machining region are designated in a relationship where the colors are mutually complementary. The display color of the still picture superimposed on the machining region is made to appear black, which is identical with the background color designated to be black, and the display color of the trajectory and the display color of the machining region are displayed in the same color.

7 Claims, 4 Drawing Figures $a$: BASE PICTURE BACKGROUND COLOR
$b$: WORKPIECE DISPLAY COLOR
$c$: TOOL TRAJECTORY DISPLAY COLOR
$d$: BACKGROUND COLOR WITHIN PATTERN
$e$: MACHINING REGION DISPLAY COLOR

SYSTEM FOR SIMULTANEOUS DISPLAY OF A TROJECTORY UPON A STILL PICTURE

DESCRIPTION

Background of the Invention

This invention relates to a trajectory display system so adapted as to simultaneously display a still picture, inclusive of a machining region, and a trace of a path of trajectory in order to display the machined profile of a workpiece on a display unit in, e.g., a numerically controlled machine tool.

Machine tools are numerically controlled in order to automate machining. In order to have a numerically controlled machine tool subject a workpiece to machining as specified by a design drawing, a numerical control command having a predetermined format must be applied to a numerical control unit.

FIG. 2 is a schematic diagram illustrating a four-axis numerically controlled lathe, which is a numerically controlled machine tool. As illustrated, the numerically controlled machine tool drives a table TBL of a machine tool SM in X and Y directions in accordance with a numerical control command from a numerical control unit NC, thereby establishing relative movement between a workpiece WK, set on the table TBL, and a tool CT so that the workpiece WK is machined into a desired profile by the tool CT. Since the tool is cooled by using a cutting oil, or the like, the machine tool is provided with a cover so that the cutting oil and cuttings will not scatter. For this reason, the state of machining is difficult to observe from the outside. Accordingly, the numerical control unit NC displays a trajectory TRC of the tool CT on its display DP so that the operator may readily verify the state of machining.

If the trajectory TRC of the tool CT is displayed on the display DP before operating the machine, when a numerical control command is applied to the numerical control unit NC in accordance with a design drawing for a workpiece having a complicated machined profile, then a program can be easily created while the input data are confirmed.

A trajectory display system is known in which a still picture inclusive of machining regions and a trace of a trajectory are displayed simultaneously in color on the display DP. With a trajectory display system of this type, it is preferred that the trajectory of each cutting tool and the machining region be displayed in different colors in cases where the machining of a workpiece by a plurality of cutting tools is simulated and displayed. This is particularly true in the case of a four-axis lathe.

In the conventional display system the machining region, which is removed from the workpiece by being machined away by the cutting tool, is displayed by removing the background color from the workpiece. To this end, the conventional display system stores machining region data in a stored picture separate from that of still picture data, which is for displaying the workpiece profile. These data are superimposed in a suitable manner to display the machined state of the workpiece. Moreover, in order to prevent a trajectory that passes through the machining region of the workpiece from disappearing together with the machining region owing to the background color, the data that constitute the trajectory trace must be stored beforehand as a stored picture separate from the still picture data for displaying the workpiece profile. With the conventional system, therefore, in order to display one trajectory together with a still picture inclusive of the machining region for the purpose of controlling the color display, data must be stored in the form of at least three stored pictures. The problem that arises is the high cost of the memory and control circuitry.

Moreover, when a color display is made by designating a trajectory in the form of a bit pattern of the three colors R (red), G (green), B (blue) based on three stored pictures, a complicated display control mechanism is needed to make the color of a trajectory which passes through a machining region removed from the workpiece by cutting tool movement the same as that of a trajectory display in the background color of the workpiece.

SUMMARY OF THE INVENTION

An object of the present invention is to provide a trajectory display system in which a display frame of a trajectory is constituted by two stored pictures to facilitate trajectory processing, and in which the display color of a trajectory is always the same so that even a complicated trajectory can be displayed in an easily understandable manner.

According to the present invention, there is provided a trajectory display system for displaying a still picture. The system includes a machining region, and a trajectory by making a color designation in the form of a black base picture background color and a three-color bit pattern. The trajectory display system includes: a memory device for storing the still picture data and trajectory data; a display system for displaying the trajectory at the same time that the still picture is displayed in superimposed form based on the data in the memory device, and a display control system for designating the still picture display color, as well as the machining region and trajectory display color on the display system in a relationship where the colors are mutually complementary.

Specifically, according to the present invention, the display color of the still picture and the display color of the machining region are designated in a relationship where the colors are mutually complementary. Therefore, the display color of the still picture superimposed on the machining region appears black, which is identical to the background color designated to be black, and the display colors of the trajectory and machining region are both designated to be the same. Consequently, the display color of the trajectory in the machining region can be displayed to be the same as that of the trajectory against the background. According to the present invention, therefore, the display color of the trajectory can be made the same at all times so that even a complicated trajectory may be displayed in an easily understandable manner.

Further, according to the present invention, the display of a trajectory is constituted by two stored pictures based on two memory devices storing the still picture data and trajectory data, as mentioned above. This lowers the cost of such circuitry, due to the smaller number of memories, and facilitates trajectory processing.

DETAILED DESCRIPTION OF THE PREFERRED EMBODIMENTS

Figure 1:
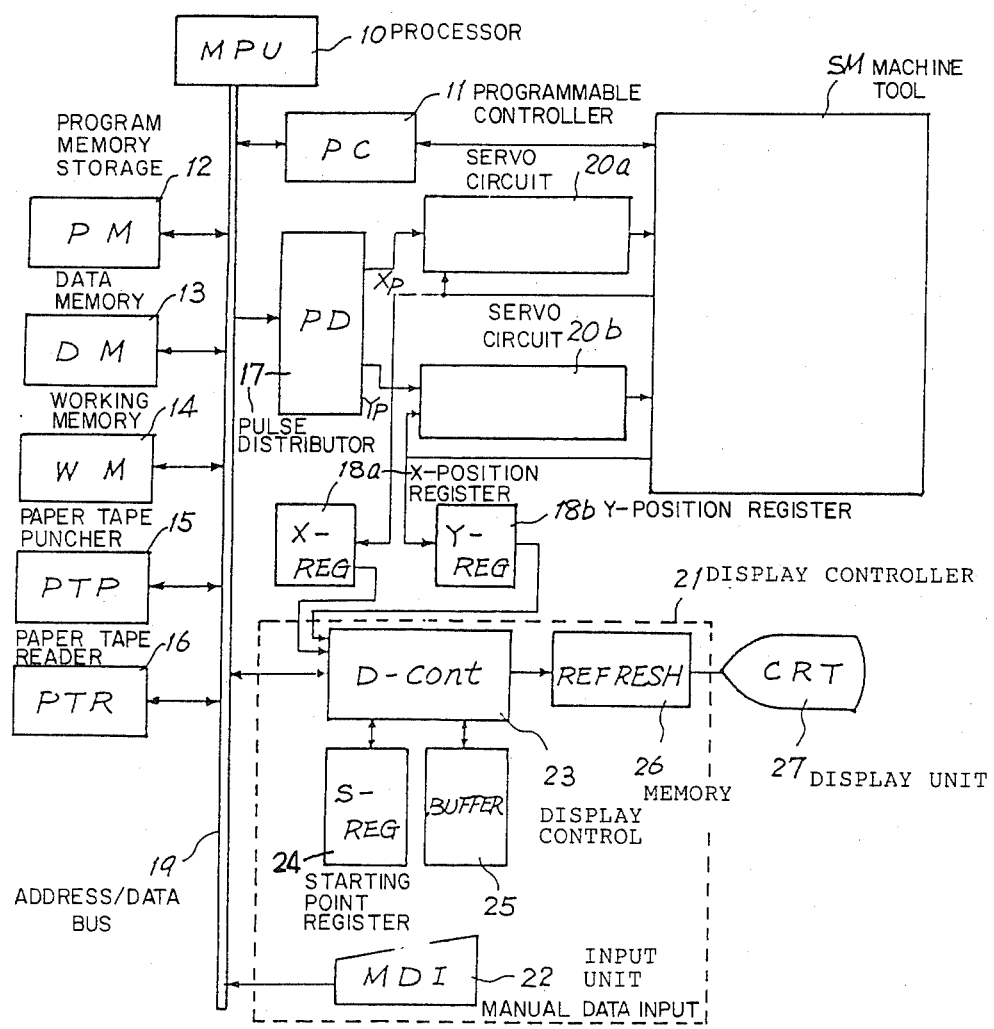
FIG. 1 is a block diagram illustrating an embodiment of a numerically controlled lathe equipped with a trajectory display system according to the present invention.
Figure 2:
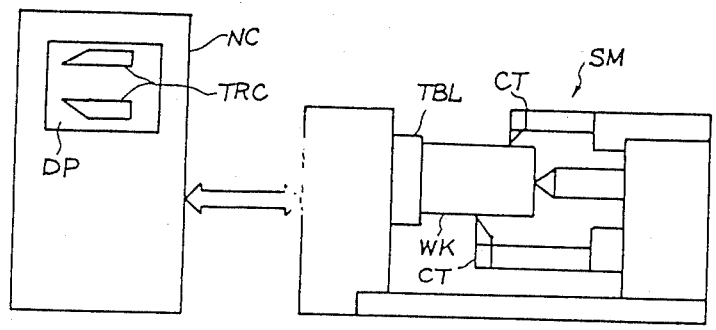
FIG. 2 is a schematic diagram showing a four-axis numerically controlled lathe exemplifying the application of the present invention.

The present invention will now be described in detail based on a preferred embodiment illustrated in the drawings.

Figure 3:
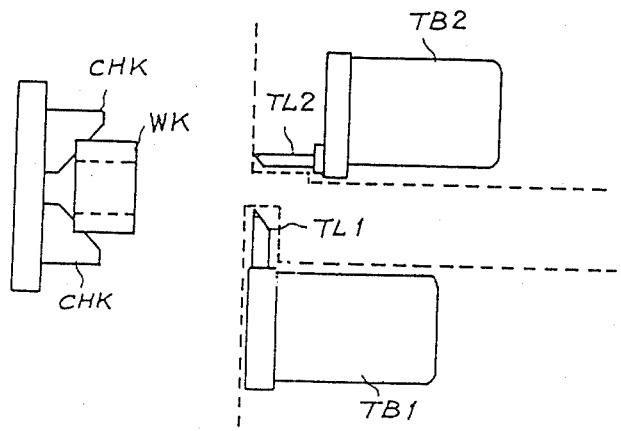
FIG. 3 is a schematic diagram illustrating the positional relationship between a workpiece and a tool in a four-axis lathe.

FIG. 3 is a schematic view showing the positional relationship between a workpiece and a tool in a four-axis lathe. As illustrated, the four-axis lathe is arranged so that a workpiece WK secured in a chuck CHK is rotated at a constant speed, while first and second tool rests TB1, TB2 are moved independently of each other along two axes, namely the X axis and Y axis, so that the inner and outer peripheries of the workpiece WK can be machined independently and simultaneously in accordance with a machining program by cutting tools TL1, TL2 mounted on the tool rests TB1, TB2, respectively.

FIG. 1 is a block diagram illustrating an embodiment of a numerically controlled lathe equipped with a trajectory display system according to the present invention. In the figure, numeral 10 denotes a processor for performing numerical control processing by executing a program. Numeral 11 denotes a programmable controller (hereinafter referred to as a "controller") for implementing the function of a magnetics circuit, which performs the sequence control of the four-axis lathe, by means of a program. Numeral 12 designates a program memory storing various control programs that are to be executed by the processor 10. Numeral 13 represents a data memory for storing various data and parameters needed for program execution performed by the processor 10, e.g., data indicative of: a machining region removed from the workpiece by movement of the cutting tools TL1, TL2; the positions of the cutting tools TL1, TL2 and workpiece WK; and the trajectories of the cutting tools TL1, TL2. Numeral 14 denotes a working memory for temporarily storing the results of processing performed by the processor 10. Numeral 15 designates a paper tape puncher for recording (punching) data in a paper tape when so required. Numeral 16 represents a paper tape reader for reading an NC tape in which numerical control commands (NC commands) have been punched. Numeral 17 denotes a pulse distributor for performing a predetermined pulse distribution calculation in accordance with a move command from the processor 10, and for outputting distributed pulses the number of which is equivalent to a commanded quantity. Numerals 18a, 18b respectively denote X- and Y-direction present position registers of the tool rests TB1, TB2 for counting position pulses from position sensors (not shown) of the four-axis lathe to indicate present positions along the X and Y axes. Numeral 19 designates an address/data bus (hereinafter referred to as a "bus") for connecting the above components to the processor 10 so that an exchange of data can be made.

Numerals 20a, 20b denote servo circuits SC-a and SC-b, respectively, for counting the difference between the number of distributed pulses and the number of position pulses to control the velocities of the tool rests TB1, TB2 of the four-axis lathe SM. In the figure, only the registers and servo circuits corresponding to one of the tool rests are illustrated.

Numeral 21 denotes a display controller which controls the display of a color display unit and includes a manual data input unit 22 having the necessary keys. The display controller 21 is constituted by a display control circuit 23 for periodically reading out the contents of the X and Y present position registers 18a, 18b and successively storing these contents in: a buffer memory, described below; a starting point register 24 for storing starting point information of each block of an NC command; a buffer memory 25 for storing position information, which is to be displayed, read out by the display control circuit 23; and a refresh memory 26, such as a graphic RAM in which a display pattern, which is for displaying a still picture inclusive of a machining region as well as a trajectory, is written by the display control circuit 23 in the form of a bit image after the pattern has its colors designated by a three-color bit pattern, described below, of the colors R (red), G (green), B (blue). Numeral 27 represents a color display constituted by display means such as a CRT (cathode-ray tube) for periodically reading out and displaying the contents of the refresh memory 26 in display controller 21.

Figure 4:
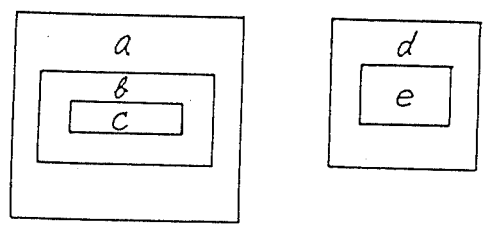
FIG. 4 is a view showing a display in an embodiment of the present invention.

Described next will be an example of display control performed in the apparatus embodied in FIG. 1. Trajectory processing in a two-screen arrangement shown in FIG. 4 will be taken as an example.

A display pattern for displaying a still picture inclusive of a machining region and a trajectory, is formed by superimposing a first picture including (a), (b) and (c), with second and third pictures which indicate regions machined by the two cutting tools, where: (a) is a base picture background; (b) is a workpiece; (c) is a tool trajectory; (d) is a background within the pattern; and (e) is a machining region (pattern). The above-mentioned pictures are color-designated by an R, G, B three-color bit pattern, including a combination of the three colors R (red), G (green) and B (blue):

a=(0, 0, 0)
b=(1, 0, 0)
c=(0, 1, 1)
d=(1, 1, 1)
e=(0, 1, 1)

More specifically, by turning red, green and blue outputs on or off in dependence upon the 1, 0 logic of each bit (R, G, B); the base screen background color (a) is designated to be black; the workpiece display color (b) is designated to be red, the tool trajectory display color (c) is designated to be blue-green, which has a complementary relationship with respect to the workpiece display color (b); the background color (d) within the pattern is designated to be white; and the display color (e) of the machining region is designated to be blue-green, which is the same as the tool trajectory display color. In the picture produced by the display unit 27, by carrying out these color designations, the colors obtained when (a), (b) and (c) of the first picture and (d) and (e) of the second picture are superimposed are set, as shown in the Table below, as an AND pattern of the bits. The colors obtained when the first and third pictures are superimposed is set in a similar manner. Since the two cutting tools have overlapping machining regions, the second and third pictures do not overlap.

|     | (a)       | (b)       | (c)            |
| --- | --------- | --------- | -------------- |
| (d) | a (black) | b (red)   | c (blue-green) |
| (e) | a (black) | a (black) | c (blue-green) |

Besides the color designation method described above, it is also possible to set (b) to green and set (c) and (e) to violet, green having a complementary relationship with respect violet. Alternatively, (b) can be set to yellow and (c) and (e) to blue, yellow having a complementary relationship with respect to blue. In other words, with the base screen background color (a) made black, the tool trajectory display color (c) made a color which is the complement of the workpiece display color (b), and the machining region display color (e) and tool trajectory display color (c) made the same, a display of the trajectory can be composed by superimposing two stored pictures in an AND mode. Both the display color of the trajectory in the machining region and the display color of the trajectory in the base screen background can be made to appear as (c)=(0,1,1), namely blue-green. As a result, trajectory processing is facilitated. Moreover, the display color of the trajectory is kept the same at all times so that a readily understandable display can be obtained even when the trajectory is complicated.

Accordingly, when displaying the trajectories of two cutting tools in the foregoing four-axis lathe of the present system, machining programming errors can be checked for ahead of time and the cutting tools or tool rests can be prevented from sustaining damage even if an abnormality should develop in the servo system during machining.

Though an embodiment of the present invention has been described above, the invention is not limited solely to the embodiment but is also useful as a trajectory display system for a movable element when creating, editing and correcting a machining tape in NC machine tools in general, and not just in the four-axis lathe of the above-described embodiment. The present invention can be modified in various ways without departing from the scope of the claims.

In the trajectory display system, according to the present invention as set forth above, the display color of a still picture and the display color of a machining region are designated so as to be mutually complementary colors. Therefore, the display color of the still picture superimposed on the machining region is displayed as the color black, which is the same as the background color designated to be black, and the display colors of the trajectory and machining region are both designated to be the same. As a result, even a complicated trajectory can be displayed in easily understood fashion. The invention is well-suited for application to a numerically controlled machine tool for displaying the manner in which a workpiece is machined by a plurality of tools.

What we claim is:

1. A trajectory display system for displaying a still picture, which includes a machining region, and a trajectory by making a color designation in the form of a black base picture background color and a three-color bit pattern, comprising:

(a) memory means for storing data corresponding to the still picture and the trajectory;
   (b) means for displaying the trajectory at the same time that the still picture is displayed in superimposed form based on the data in said memory means; and
   (c) display control means for designating a still picture display color as well as a machining region color and a trajectory display color on the display means in a relationship where the colors designated are mutually complementary.

2. A trajectory display system according to claim 1, wherein said memory means stores, as still picture data, profile data of a workpiece to be machined and data indicative of a machining area removed from the workpiece by movement of a tool, and stores a trajectory of the tool, as the trajectory data, whereby a display of the tool trajectory of a machine tool is obtained.

3. A trajectory display system according to claim 2, wherein said memory means stores trajectories of a plurality of cutting tools, as tool trajectory data, to obtain a display of the tool trajectories of a multiple-axis lathe.

4. A trajectory display system according to claim 1, wherein said display control means comprises:

(i) a display control circuit, for periodically reading out contents stored in said memory means and successively storing these contents in a buffer memory, and
   (ii) a refresh memory in which a display pattern for displaying the still picture inclusive of the machining region and the trajectory, is written by said display control circuit in the form of a bit image, after the colors of said pattern have been designated by the three-color bit pattern.

5. A trajectory display method for displaying a still picture, which includes a machining region and a trajectory, by making a color designation in the form of the black base picture background color and a three-color bit pattern, comprising the following steps:

(a) storing data corresponding to the still picture and the trajectory;
   (b) displaying the trajectory at the same time as the still picture in superimposed form based on the stored data; and
   (c) designating a still picture display color, a machining region color and a trajectory display color in a relationship where the colors designated are mutually complementary.

6. The trajectory display method according to claim 5, wherein step (a) further comprises the following steps:

(i) storing, as still picture data, profile data of a workpiece to be machined and data indicative of a machining area removed from the workpiece by movement of a tool; and
   (ii) storing a trajectory of the tool, as the trajectory data, whereby a display of the tool trajectory of a machine tool is obtained.

7. The trajectory display method according to claim 6, wherein step (a)(ii) comprises the following substep: storing trajectories of a plurality of cutting tools, as tool trajectory data, to obtain a display of tool trajectories of a multiple axis lathe.

* * * * *

UNITED STATES PATENT AND TRADEMARK OFFICE
CERTIFICATE OF CORRECTION

PATENT NO. : 4,734,845

DATED : March 29, 1988

INVENTOR(S) : Kawamura et al.

It is certified that error appears in the above-identified patent and that said Letters Patent is hereby corrected as shown below:

Front Page, [54] line 2, "TROJECTORY" should be --TRAJECTORY--;

[57] line 5, delete "(e)";

line 6, delete "(e)".

Col. 1, line 2, "TROJECTORY" should be --TRAJECTORY--.

Signed and Sealed this

Second Day of August, 1988

*Attest:*

DONALD J. QUIGG

*Attesting Officer*     *Commissioner of Patents and Trademarks*